(12) United States Patent
Hannikainen

(10) Patent No.: US 9,193,537 B2
(45) Date of Patent: Nov. 24, 2015

(54) MOVABLE PROCESSING APPARATUS FOR MINERAL MATERIAL PROCESSING AND FRAME FOR PROCESSING APPARATUS

(75) Inventor: Teemu Hannikainen, Pirkkala (FI)

(73) Assignee: Metso Minerals, Inc., Helsinki (FI)

( * ) Notice: Subject to any disclaimer, the term of this patent is extended or adjusted under 35 U.S.C. 154(b) by 230 days.

(21) Appl. No.: 13/984,220

(22) PCT Filed: Mar. 30, 2011

(86) PCT No.: PCT/FI2011/050272
§ 371 (c)(1),
(2), (4) Date: Aug. 7, 2013

(87) PCT Pub. No.: WO2012/110683
PCT Pub. Date: Aug. 23, 2012

(65) Prior Publication Data
US 2013/0313400 A1 Nov. 28, 2013

(30) Foreign Application Priority Data
Feb. 15, 2011 (WO) .................. PCT/FI2011/050139

(51) Int. Cl.
*B62D 53/06* (2006.01)
*B65G 47/20* (2006.01)
(Continued)

(52) U.S. Cl.
CPC ................ *B65G 47/20* (2013.01); *B02C 21/02* (2013.01); *B02C 21/026* (2013.01); *B65G 37/00* (2013.01); *B65G 41/002* (2013.01)

(58) Field of Classification Search
CPC ........... B02C 1/04; B02C 21/02; E21B 7/021; E21B 7/026; B62D 53/065; B65G 41/002; B65G 47/02

USPC .................... 280/425.2, 441.2; 248/646–647; 241/268
See application file for complete search history.

(56) References Cited

U.S. PATENT DOCUMENTS 2,707,062 A * 4/1955 Dean ............................ 414/481
3,151,884 A * 10/1964 Felburn ...................... 280/441.2
(Continued)

FOREIGN PATENT DOCUMENTS

CN 201603597 U 10/2010
CN 101945803 A 1/2011
(Continued)

OTHER PUBLICATIONS

English translation of CN101945803A.
(Continued)

*Primary Examiner* — James English
(74) *Attorney, Agent, or Firm* — Andrus Intellectual Property Law, LLP

(57) ABSTRACT

A movable processing apparatus for mineral material processing and a frame for the processing apparatus which apparatus comprises a movable frame which frame comprises a support part for supporting the frame against the ground and a rear part which is attached to the support part for receiving mineral material and a neck part which comprises a curved bottom surface, and the support part and the rear part are attached to each other through the neck part. The frame further comprises a centre part, above the support part, which centre part is attached to the support part, and a curved nape part which comprises a curved upper surface and through which nape part the centre part and the rear part are attached to each other, and that the upper surface and the bottom surface are curved in opposite directions.

10 Claims, 3 Drawing Sheets

(51) Int. Cl.
    *B65G 41/00*     (2006.01)
    *B02C 21/02*     (2006.01)
    *B65G 37/00*     (2006.01)

(56) References Cited

U.S. PATENT DOCUMENTS

| | | | | |
|---|---|---|---|---|
| 4,618,307 | A * | 10/1986 | Kress et al. | 414/498 |
| 5,040,849 | A * | 8/1991 | Thomas et al. | 298/22 R |
| 5,324,061 | A | 6/1994 | Lay | 280/417.1 |
| 5,797,615 | A * | 8/1998 | Murray | 280/441.2 |
| 2009/0152387 | A1 * | 6/2009 | Nakayama et al. | 241/268 |
| 2011/0025018 | A1 * | 2/2011 | Maiorana et al. | 280/423.1 |
| 2012/0138756 | A1 * | 6/2012 | Heimbuch et al. | 248/205.1 |
| 2012/0248736 | A1 * | 10/2012 | Dierks et al. | 280/425.2 |
| 2013/0306437 | A1 * | 11/2013 | Dunn | 198/632 |

FOREIGN PATENT DOCUMENTS

| | | | |
|---|---|---|---|
| EP | 1 110 625 | A2 | 6/2001 |
| GB | 2 444 218 | A | 5/2008 |
| JP | 01-317840 | | 12/1989 |
| JP | 2004-188389 | A | 7/2004 |
| WO | 97/41971 | A1 | 11/1997 |
| WO | 2004/087324 | A1 | 10/2004 |

OTHER PUBLICATIONS

English translation of CN210603597U.
Chinese Office Action and English Translation.
Japanese Office Action and English Translation.
Patent Abstracts of Japan—JP-A-2004-188389.
Patent Abstracts of Japan—01-317840.
Patent Abstracts of Japan,JP 2006 110406 A (Caterpillar Mitsubishi Ltd), Apr. 27, 2006.
International Preliminary Report on Patentability dated May 13, 2013.
PCT International Search Report dated Jun. 12, 2011.
Written Opinion dated Jun. 12, 2011.

* cited by examiner

MOVABLE PROCESSING APPARATUS FOR MINERAL MATERIAL PROCESSING AND FRAME FOR PROCESSING APPARATUS

CROSS-REFERENCE TO RELATED APPLICATIONS

This application claims priority to PCT/FI2011/050272, filed Mar. 30, 2011, and published in English on Aug. 23, 2012 as publication number WO 2012/110683, which claims priority to PCT/FI2011/050139, filed Feb. 15, 2011, incorporated herein by reference.

FIELD OF THE INVENTION

The invention relates to a movable processing apparatus which is suitable for mineral material processing and a frame for the processing apparatus. Particularly, though not exclusively, the invention relates to a processing apparatus which is suitable for crushing, pre-screening, screening and/or conveying further mineral material.

BACKGROUND OF THE INVENTION

Rock is gained from the earth for crushing by exploding or excavating. Rock can also be natural and gravel or construction waste such as brick or concrete. Mobile processing apparatuses (for example, crushing apparatuses) and stationary crushing applications are used in material processing (for example, crushing). An excavator or wheeled loader, for example, loads the material to be processed into the crusher's feed hopper from where the material to be processed ends up in a feeder which feeds the rock material, for example, in a jaw of a crusher or the feeder moves the rock material towards the crusher. A desired material, for example, fine material can be directed through the feeder to a side conveyor that this material does not result in further processing, for example, crushing. A usual location of the side conveyor is under the feeder where selected material can drop. Material directed past the further process is conveyed aside the processing apparatus by means of the side conveyor, for example, in a pile.

Problems related to fatigue resistance of frame structures appear in material processing plants according to prior art. Joint regions in the frame structure are most critical positions in which stresses and stress variations are largest. When a disadvantageous placement of a joint is cumulating with a disadvantageous loading of a welding seam this results in a reduction of fatigue resistance.

An object of the invention is to provide a movable processing apparatus for mineral material in connection with which known problems related to fatigue resistance can be avoided or at least reduced.

SUMMARY

According to the invention there is provided a movable processing apparatus for mineral material processing which comprises a movable frame which frame comprises a support part for supporting the frame against the ground and a rear part which is attached to the support part for receiving mineral material and a neck part which comprises a curved bottom surface, and the support part and the rear part are attached to each other through the neck part. The frame further comprises a centre part, above the support part, which centre part is attached to the support part, and a curved nape part which comprises a curved upper surface and through which nape part the centre part and the rear part are attached to each other, and that the upper surface and the bottom surface are curved in opposite directions.

Preferably the bottom surface of the neck part is located at a distance of a first radius from a first centre and the upper surface of the nape part is located at a distance of a second radius from a second centre, and that the bottom surface of the neck part and the upper surface of the nape part are located between the first and second centres.

Preferably the rear part and the centre part are attached to each other by a joint which has an intersection on a line located between the first centre and the second centre.

Preferably the joint is located mainly between a first tangent of the bottom surface of the neck part and a second tangent of the upper surface of the nape part. The first tangent is located at an intersection of the line between the centres and the bottom surface of the neck part and the second tangent is located at an intersection of the line between the centres and the upper surface of the nape part. Said joint may be one of the following: a welding seam, a flange joint or a lap joint. A profile of the frame may be one of the following: an I-beam profile or a box beam profile.

According to the invention there is also provided a frame for a movable mineral material processing apparatus which frame comprises a support part for supporting the frame against the ground and a rear part which is attached to the support part for receiving mineral material and a neck part which comprises a curved bottom surface, and the support part and the rear part are attached to each other through the neck part. The frame further comprises a centre part, above the support part, which centre part is attached to the support part, and a curved nape part which comprises a curved upper surface and through which nape part the centre part and the rear part are attached to each other, and that the upper surface and the bottom surface are curved in opposite directions.

The frame of the processing apparatus which is open from below allows pivoting a side conveyor from a side to another side below the frame. This together with no need of a separate frame for a feeder and for wings of a feed hopper is one important starting point for the design of a rear end of the frame of a processing plant. The curved surfaces produce smooth forms having no discontinuities at the most critical regions for stress.

The design of the rear end of the frame according to the invention results in better transportability because the rear end is more open and higher than prior art solutions.

Different embodiments of the present invention will be illustrated or have been illustrated only in combination with one or some aspects of the invention. A person skilled in the art understands, that any embodiment of one aspect of the invention may be applied in the same aspect of the invention and in other aspects alone or as a combination with other embodiments.

BRIEF DESCRIPTION OF THE DRAWINGS

The invention will be described, by way of example, with reference to the accompanying drawings, in which.

DETAILED DESCRIPTION

In the following description, like numbers denote like elements. It should be appreciated that the illustrated drawings are not entirely in scale, and that the drawings mainly serve the purpose of illustrating embodiments of the invention.

Figure 1:
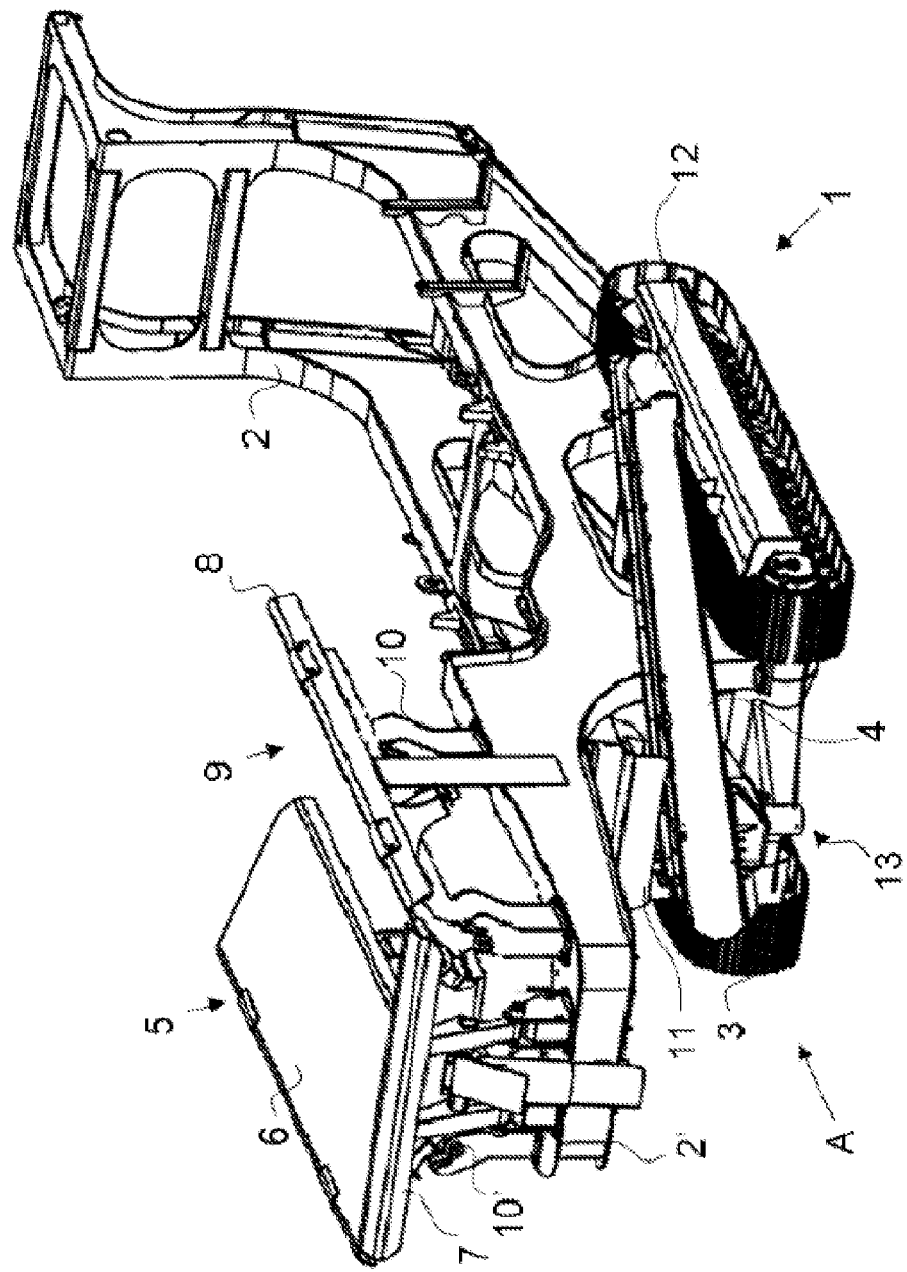
FIG. 1 shows a movable mineral material processing apparatus according to a preferable embodiment.

FIGS. 1 shows a movable mineral material processing apparatus 1 comprising a frame 2. The processing apparatus comprises tracks 3, attached to the frame, for moving the processing apparatus and a side conveyor 4 which can be pivoted from a side to another side of the processing apparatus. The processing apparatus can be equipped with, for example, mineral material screening, conveying and/or crushing means (not shown in the figures). The crushing means may comprise, for example, a jaw, a cone, a gyratory or an impact crusher.

A movable or mobile processing apparatus may also be movable on wheels, skids or legs. An alternative for moving the processing apparatus is forming the frame of the processing apparatus as a base having wheels which is towable by a vehicle.

In FIG. 1, a feed hopper 5 is arranged in a rear part 2' of the frame 2 through which the material to be processed is received in the processing apparatus. Wings 6, 7, and 8 forming the feed hopper can be folded away from an operating position. A feeder (not shown in the figures) is arranged between and under the wings of the feed hopper, with which feeder the material loaded in the feed hopper is fed forward through an open front part 9 of the feed hopper. The feed hopper comprises a first side wing 6, a rear wing 7 and a second side wing 8 which are attached to the frame 2, to its rear part 2', through supports 10. The supports 10 are equipped with pivoting joints 10' for folding the side wings and the rear wing downwards to sides of the processing apparatus 1 during transportation and storage, for example. When the wings 6, 7, and 8, equipped with hydraulic actuators, of the feed hopper 5 are folded, the feeder for the material to be processed can be mounted on the frame 2, on its rear part 2'. The feeder can be put in operating position by folding up the wings of the feed hopper in the operating position. Mineral material screening, conveying and/or crushing means can be located on the frame next to the feeder.

Desired material, for example, fine material can be directed via the feeder or through the feeder to drop via a material guide 11 to a belt 12 or a corresponding endless conveying base of the side conveyor 4 that this material does not result in further processing. A starting end of the side conveyor 4 is preferably located under the feeder and the rear part 2' of the frame.

When it is desired that the side conveyor 4 can be pivoted from one side to another side, the frame of the processing plant has to be open from below. This together with no need of a separate frame for the feeder and for the wings of the feed hopper is a starting point for the design of a rear end of the frame of the whole processing plant. The side conveyor 4 can be pivoted from one side to another side of the processing apparatus 1. A pivot joint 13 is arranged in the processing apparatus 1 for the side conveyor by means of which the side conveyor is attached to the frame 2. The side conveyor can be pivoted, if necessary, manually around the pivot joint in different positions. The side conveyor can be directed, if necessary, in any direction in a pivoting sector of 180 degrees.

Simplest the side conveyor can be pivoted to one side of the processing apparatus to an operating position. Preferably the side conveyor can be pivoted to both sides of the processing apparatus to operating positions. The side conveyor can be arranged in an operating position in any direction in a region of the pivoting sector.

Figure 2:
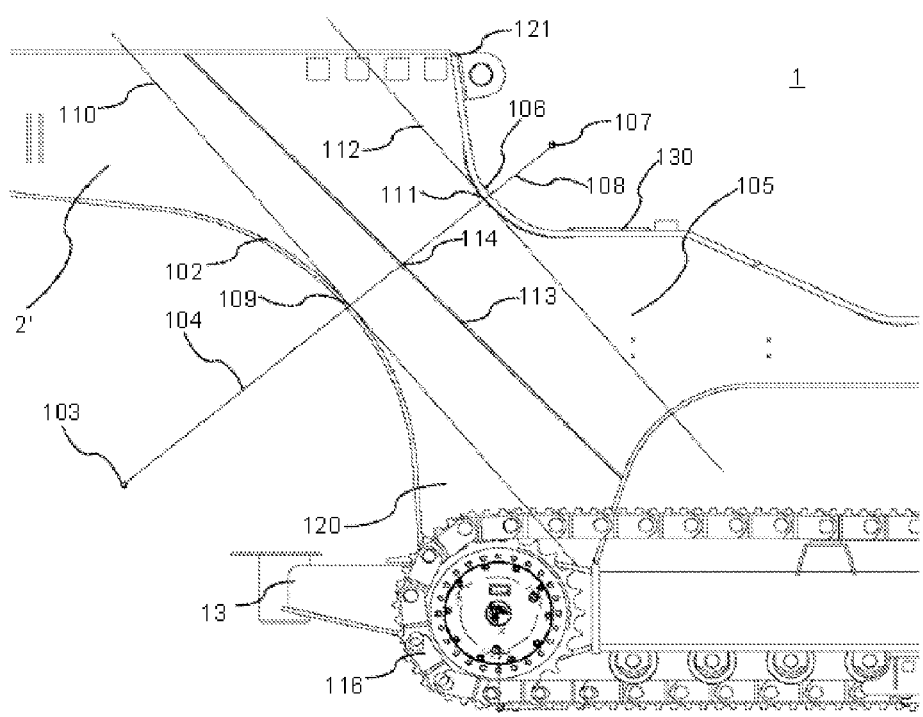
FIG. 2 shows a side view of the processing apparatus of FIG. 1.
Figure 3:
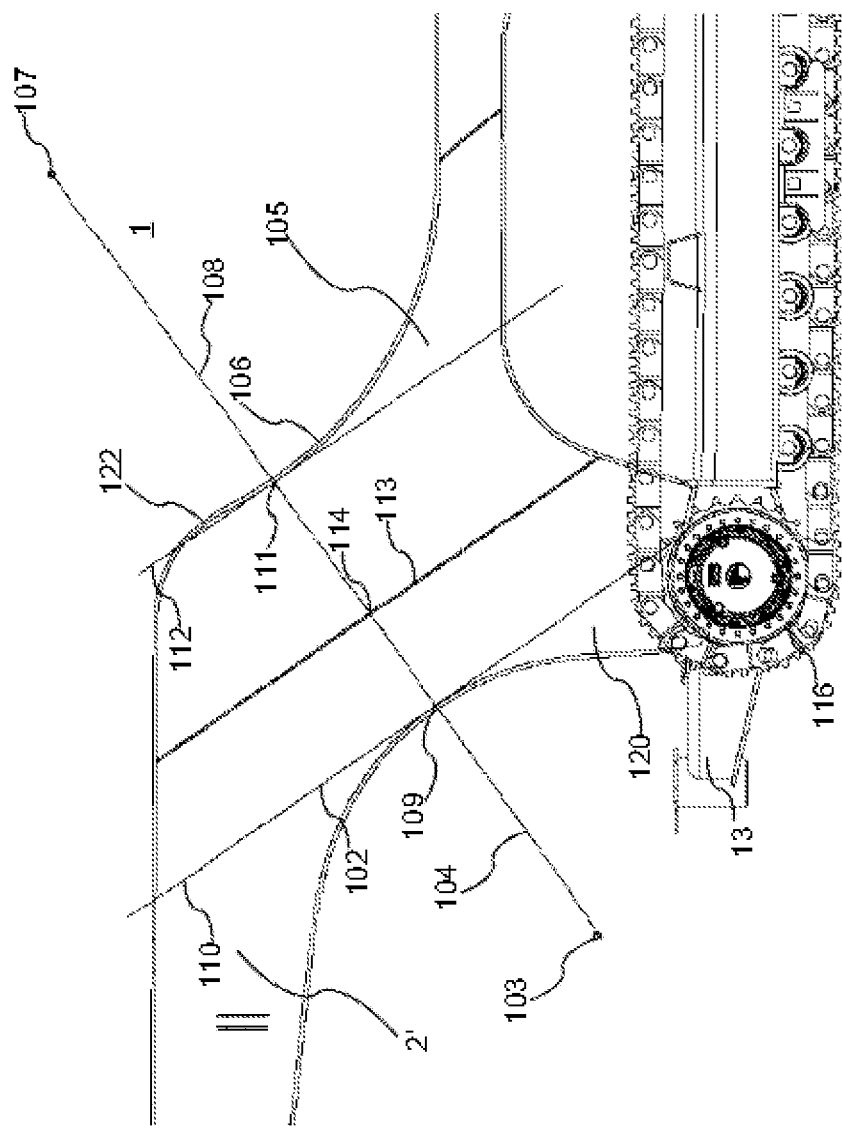
FIG. 3 shows an alternative embodiment of FIG. 2.

A side view of the processing apparatus of FIG. 1 is shown in FIGS. 2 and 3 wherein the frame 2 is shown more detailed.

In order to clarify the issues the side conveyor is left away from the figure and only the pivot joint 13 of the side conveyor at side of the frame is shown.

When the side conveyor, the feeder, the wings of the feeding unit, a dividing hopper or the material guide 11, and a crusher are located on the frame of the processing apparatus and it is desired to pack these as compact as possible, what is important because of transportability, price and weight of the processing apparatus, a space reservation is created which can be used for designing the frame. The design of the rear end of the frame according to the invention results in better transportability. This means particularly a situation in which a processing apparatus equipped with a track base is driven rearwards onto a transportation carriage. Because the rear end is more open and higher than solutions according to prior art it does not stick so easy to the transportation carriage. When these requirements are fulfilled, a structure as tough as possible is tried to achieve in the design of the frame which, however, is cheap to manufacture.

The frame 2 comprises the rear part 2' above which the feeder and the wings of the feeder hopper are attached as shown in connection with the previous figure. In addition to the rear part 2' the frame structure comprises a support part 120 through which the processing plant 1 is supported against the ground surface, for example, via a track base 116. The frame structure comprises further a centre part 105 which continues to a support part of another end of the track base and further to a front part of the frame 2 which are not shown here in more detail. A crusher, one end of a discharge conveyor, a transmission and a power source such as a diesel or an electric motor, for example, are attached to the centre part of the frame.

The support part 120 and the rear part 2' are connected to each other by a neck part 102, a radius 104 of a curve of the curved neck part is in this example 1100 mm, from a centre 103 to a point 109 of the curved bottom surface. The centre part 105 of the frame structure is connected to the support part 120 by a curved structure which is substantially left under the centre part 105. A curved nape part 106 is located at the upper part of the centre part 105, a radius of a curve 108 of the curved nape part is in this example 300 mm, from a centre 107 to a point 109 of the curved upper surface 111, The curvature of the neck part 102 and the nape part 106 does not necessarily follow a circular symmetric radius along the whole length of the curve, but a length of the radius to be created, from the centre 103, 107 to the curve of the of the neck part and/or nape part, may vary in different locations of the curve according to the embodiment. An objective by the compact placement of parts and devices it to minimize the total length of the plant.

In the design of the frame, height of the "nape" or distance between lines 110 and 112 was desired to be maximized. This has two influences. Firstly, the rear end of the frame is made as rigid as possible so that the feeder works the best possible way because deflections are minimized, and secondly, stresses at the nape location are minimized.

After that, shapes as fluent as possible have been desired to make particularly at such locations having heaviest stresses. That is, curves have been utilized at the nape region. The curved surfaces create smooth forms which have no discontinuities at the most stress critical regions.

The most relevant difference between FIGS. 2 and 3 is the design of the nape part. In FIG. 2, the nape part comprises a form 121 providing for a corner for the purpose of allowing preferably attaching the crusher as near as possible a starting point of the curved portion so that a compact layout for the devices is reached, such as layout of the feeder and the crusher.

An alternative curved form 122 is implemented in the nape part of FIG. 3, by which the corner 121 according to FIG. 2 may be replaced. Then the compactness of the layout is different from the solution according to FIG. 2.

In practise, plates of the frame are cut from steel plates having a certain size. For this reason, joint welding seams of plates have to be placed in some locations. The locations of the seams are tried to select as optimal as possible in view of plate use (as little as possible waste plate). This however may not take place at the cost of durability of the frame.

Following these requirements a joint seam 113 is located at a location where the stresses are as low as possible, The joint seam is located close the neutral axis of the nape region. (The stresses at the neutral axis are 0). The direction of the welding joint coinsides as much as possible with the direction of the principal stress wherein the fatigue resistance of the welding seam is as best as possible. In view of the fatigue resistance a welding which is transverse directed to the load is unfavourable.

It is possible to produce the frame structures of large unitary pieces, for example, to cut the rear part 2', the centre part 105 and the support part 120 from one metal plate. This is true particularly for smaller apparatuses but when machine size, increases also the frame increases, and it is preferable to manufacture the frame from several pieces. The rear part 2' and the centre part 105 can be made from several parts, for example, so that the parts are connected to each other by a joint which is, for example, a flange joint or the welding seam 113. The location of the joint is relevant in view of the fatigue stresses. The joint should preferably be located at such a region which is not subjected to loading forces. The joint may be curved but in view of production technology a linear joint is the most preferable solution.

In this embodiment the joint 113 is a welding joint which is located in a region between the neck part 102 and the nape part 106, preferably so that the joint 113 intersects a line (103-104-109-114-111-108-107) to be formed between said centres 103 and 107 in an intersection point 114. In a more preferably case, a region defined by a tangent 110 at the intersection 109 of the curve of the neck part 102 and the line from the centre 103 to the centre 107, and by a tangent 112 at the intersection 111 of the curve of the nape part 106 and the line from the centre 103 to the centre 107, includes the joint 113 so that the joint does not intersect said tangents in a region formed by the frame structure (the rear part 2', the centre part 105 and the support part 120).

An I-beam profile frame or a box beam frame manufactured, for example, of steel plate can be used as the frame structure, but also other solutions may be implemented such as frame structures moulded or produced of metal and/or composite material.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features.

As such, the foregoing description shall be considered as merely illustrative of the principles of the invention, and not in limitation thereof. Hence, the scope of the invention is only restricted by the appended patent claims.

The invention claimed is:

1. A movable processing apparatus for mineral material processing, comprising:
a movable frame comprising a support part, a rear part, a neck part, a center part attached to the support part above the support part, and a nape part, wherein:
the support part is configured to support the frame against the ground;
the rear part is attached to the support part for receiving mineral material;
the support part and the rear part are attached to each other through the neck part;
the center part and the rear part are attached to each other through the nape part;
the neck part includes a curved bottom surface;
the nape part includes a curved upper surface;
the upper surface of the nape part and the bottom surface of the neck part being curved in opposite directions, wherein:
the bottom surface of the neck part is located at a distance of a first radius from a first center;
the upper surface of the nape part is located at a distance of a second radius from a second center;
the bottom surface of the neck part and the upper surface of the nape part are located between the first center and second center; and
the rear part and the center part are attached to each other by a joint that has an intersection on a line located between the first center and the second center.

2. The processing apparatus according to claim 1, wherein the first radius is greater than the second radius.

3. The processing apparatus according to claim 1, wherein:
the joint is located mainly between a first tangent of the bottom surface of the neck part and a second tangent of the upper surface of the nape part;
the first tangent is located at an intersection of the line between the centers and the bottom surface of the neck part; and
the second tangent is located at an intersection of the line between the centers and the upper surface of the nape part.

4. The processing apparatus according to claim 1, wherein:
the joint is located mainly between a first tangent of the bottom surface of the neck part and a second tangent of the upper surface of the nape part;
the first tangent is located at an intersection of the line between the centers and the bottom surface of the neck part;
the second tangent is located at an intersection of the line between the centers and the upper surface of the nape part; and
the joint comprises at least one seam or joint selected from a group consisting a welding seam, a flange joint, and a lap joint.

5. The processing apparatus according to claim 1, wherein a profile of the frame is one of the following: an I-beam profile or a box beam profile.

6. A frame for a movable mineral material processing apparatus, the frame comprising;
a support part configured to support the frame against the ground;
a rear part attached to the support part for receiving mineral material;
a neck part including a curved bottom surface;
a nape part including a curved upper surface, the upper surface and the bottom surface being curved in opposite directions;
a center part located above the support part, the center part being attached to the support part, wherein:

the support part and the rear part are attached to each other through the neck part;

the center part and the rear part are attached to each other through the nape part;

the bottom surface of the neck part is located at a distance of a first radius from a first center;

the upper surface of the nape part is located at a distance of a second radius from a second center;

the bottom surface of the neck part and the upper surface of the nape part are located between the first center and second center; and the rear part and the center part are attached to each other by a joint that has an intersection on a line located between the first center and the second center.

7. The frame according to claim 6, wherein the first radius is greater than the second radius.

8. The frame according to claim 6, wherein:

the joint is located mainly between a first tangent of the bottom surface of the neck part and a second tangent of the upper surface of the nape part;

the first tangent is located at an intersection of the line between the centers and the bottom surface of the neck part; and the second tangent is located at an intersection of the line between the centers and the upper surface of the nape part.

9. The frame according to claim 6, wherein:

the joint is located mainly between a first tangent of the bottom surface of the neck part and a second tangent of the upper surface of the nape part;

the first tangent is located at an intersection of the line between the centers and the bottom surface of the neck part;

the second tangent is located at an intersection of the line between the centers and the upper surface of the nape part; and the joint comprises at least one seam or joint selected from a group consisting of: a welding seam, a flange joint, and a lap joint.

10. The frame according to claim 6, wherein a profile of the frame is one of the following: an I-beam profile or a box beam profile.

* * * * *